(12) United States Patent
Van Casteren

(10) Patent No.: US 7,164,237 B2
(45) Date of Patent: Jan. 16, 2007

(54) CIRCUIT ARRANGEMENT FOR OPERATING DISCHARGE LAMPS

(75) Inventor: Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 53 days.

(21) Appl. No.: 10/535,286

(22) PCT Filed: Oct. 28, 2003

(86) PCT No.: PCT/IB03/04828

§ 371 (c)(1),
(2), (4) Date: May 17, 2005

(87) PCT Pub. No.: WO2004/047503

PCT Pub. Date: Jun. 3, 2004

(65) Prior Publication Data

US 2006/0049770 A1 Mar. 9, 2006

(30) Foreign Application Priority Data

Nov. 21, 2002 (EP) .................................. 02079853

(51) Int. Cl.
*H05B 37/02* (2006.01)

(52) U.S. Cl. .................. 315/209 R; 315/244; 315/307; 315/291; 315/205; 315/250; 315/DIG. 5; 315/DIG. 7

(58) Field of Classification Search ............ 315/200 R, 315/209 R, 205, 250, 252, 291, 244, 307, 315/312, 324, 325, DIG. 5, DIG. 7

See application file for complete search history.

(56) References Cited

U.S. PATENT DOCUMENTS

| | | | |
|---|---|---|---|
| 4,525,648 A * | 6/1985 | De Bijl et al. | ............... 315/224 |
| 6,236,168 B1 * | 5/2001 | Moisin | ........................ 315/291 |
| 6,384,544 B1 | 5/2002 | Greenwood | |
| 6,414,448 B1 | 7/2002 | Durkan et al. | |

* cited by examiner

*Primary Examiner*—Haissa Philogene

(57) ABSTRACT

A DC-AC converter in a half bridge configuration is used for operation with high pressure discharge lamps as well as low pressure discharge lamps. The converter consists in two switches (T1-T2) serially connected through a first series of diodes (D1, D2) and a second series of diodes (D3,D4) to which at their middle points (N1, N2) a first and a second lamp loads (L1,L2,LA1,LA2) are connected. Furthermore, the second terminals of the lamp loads are connected to the middle point of a series of capacitors (C3,C4) which are also connected to the terminals (Ki,K2) of the supply voltage source. The converter includes also four diodes (D5,D6,D7, D8) which shunt the switches (T1,T2) and their respective series of diodes (D1,D2,D3,D4). The switches (T1,T2) are controlled by a controller (CC) which renders alternatively conductive at low frequency the two switches (Ti,T2). In the first operating state, the first switch (T1) is rendered conductive and non-conductive at a high-frequency while the second switch (T2) is maintained in a non-conductive state, in the second operating state the second switch (T2) is rendered conductive and non-conductive at high-frequency while the first switch (T1) is maintained in a non-conductive state. The series of two capacitors (C3,C4) can be replaced by a series of two switches (T3,T4) in order to obtain a full bridge configuration of the converter. The particular configuration of the network and its operating mode allow to drive the lamp loads in such a way that the difference in power consumed by the lamps is comparatively small.

6 Claims, 1 Drawing Sheet

CIRCUIT ARRANGEMENT FOR OPERATING DISCHARGE LAMPS

FIELD OF THE INVENTION

The invention relates to a circuit arrangement for operating a lamp load comprising
input terminals for connection to a supply voltage source,
a series arrangement I comprising a first switching element and a second switching element and connecting the input terminals,
a control circuit coupled to respective control electrodes of the first switching element and the second switching element for controlling the conductive state of the first and the second switching element,
a series arrangement II comprising a first circuit element A and a second circuit element B and connecting the input terminals,
a first load circuit comprising a first ballast inductor and first lamp connection terminals and connecting a terminal N1 of the series arrangement I between the switching elements to a terminal of the series arrangement II between the first circuit element A and the second circuit element B.

BACKGROUND OF THE INVENTION

Such a circuit arrangement is a DC-AC-converter of the bridge type and is often used for the operation of both high pressure discharge lamps as well as low pressure discharge lamps. The circuit arrangement can be a full bridge or a half bridge. A half bridge comprises only two switching elements, since the first circuit element A and the second circuit element B are both formed by capacitors. A full bridge, however, comprises four switching elements, since the first circuit element A and the second circuit element B are formed by a third and fourth switching element. In a full bridge the control circuit is more complicated than in a half bridge since the conductive state of four switching elements instead of only two switching elements needs to be controlled. During operation the amplitude of the voltage across the load circuit(s) in a full bridge is twice as high as it is in a half bridge powered by the same supply voltage source. As a consequence a full bridge can be used to operate two lamps in series so that each of the lamps carries the same current. In case the lamps have approximately the same lamp voltage, as is usually the case for low pressure discharge lamps, the lamps will approximately consume the same amount of power and have approximately the same light output. In case of high pressure discharge lamps, however, the lamp voltage depends strongly on the age of the lamp (age=number of burning hours). As a consequence the light outputs of two high pressure lamps operated in series can differ substantially when the lamps have a different age. The voltage across the load circuit of a half bridge powered by the same supply voltage source will generally not be high enough to operate such a series arrangement of lamps. A disadvantage of the full bridge is that, because of the two additional switches and the more complicated control circuit, it is more expensive than a half bridge. As an alternative for of operating two lamps in series in a fall bridge, two load circuits comprising a lamp and a ballast inductor each, can be connected in parallel in a half bridge. In case the lamps are low pressure mercury lamps that are operated with a high frequency lamp current, the lamp currents can be controlled at substantially equal values by making use of an equalizer transformer. However, such a transformer is an expensive component. In case the lamps are high pressure lamps operated by a low frequency AC current, an equalizer transformer cannot be used to control the lamp currents since the low frequency would demand a very big transformer. Nevertheless, in case no equalizer transformer is used, a difference in lamp voltage between the lamps will in practice often result in substantial differences in the amounts of power supplied to the lamps.

SUMMARY OF THE INVENTION

The invention aims to provide a circuit arrangement that is capable of operating two lamps in parallel in such a way that the difference in power consumed by the lamps is comparatively small.

A circuit arrangement as described in the opening paragraph is therefore characterized in that the circuit arrangement comprises
a series arrangement III comprising terminal N1, a first diode D1 and a second diode D2 and connecting the first switching element and the second switching element, terminal N1 being situated between first diode D1 and second diode D2,
a series arrangement IV comprising a third diode D3 and a fourth diode D4 and connecting the first switching element and the second switching element,
a fifth diode D5 shunting the first switching element and diode D1,
a sixth diode D6 shunting the first switching element and diode D3,
a seventh diode D7 shunting the second switching element and diode D2,
an eighth diode D8 shunting the second switching element and diode D4,
a second load circuit comprising a second ballast inductor and second lamp connection terminals and connecting a terminal N2 of the series arrangement IV, situated between the third diode D3 and the fourth diode D4 to a terminal of the series arrangement II between the first circuit element A and the second circuit element B.

When a conducting switching element in a circuit arrangement according to the invention is rendered non-conductive the ballast conductors in the first and second load circuit cause the currents in the load circuits to maintain their polarity for a short time lapse, while their amplitude is decreasing. During this time lapse the load circuit currents are conducted by part of the diodes D5–D8, forming "free wheel diodes". In a circuit arrangement according to the invention the current in each of the load circuits, immediately after a switching element has been rendered non-conductive, is flowing through a different "free wheel diode". As a consequence the two lamps are operated independently. It has been found that because of this independent operation a difference in lamp voltage, does not cause a substantial difference between the amounts of power consumed by the lamps.

It be remarked at this stage that a circuit arrangement according to the invention can be rendered suitable for the operation of more than two lamps in parallel. For each additional lamp four more diodes and an additional load circuit have to be implemented in the circuit arrangement. For instance operation of three lamps in parallel can be realized as follows. The circuit arrangement is equipped with a further series arrangement V connecting the first and the second switching element and comprising two further diodes. Two additional diodes each shunt a further diode and one of the switching elements and a third load circuit comprising a third ballast inductor and third lamp connection terminals connects a terminal between the further diodes to a terminal between the first circuit element A and the second circuit element B.

Good results have been obtained for embodiments of a circuit arrangement according to the invention, wherein the first circuit element A and the second circuit element B each comprise a capacitor. Such embodiments are half bridge circuits, that are comparatively cheap. It has been found more in particular that such embodiments are very suitable for operating high pressure discharge lamps in parallel in case the control circuit is equipped with means for alternately at a low frequency operating the circuit arrangement in a first and a second operating state, wherein in the first operating state the first switching element is rendered conductive and non-conductive at a high frequency while the second switching element is maintained in a non-conductive state, and wherein in the second operating state the second switching element is rendered conductive and non-conductive at a high frequency while the first switching element is maintained in a non-conductive state. This mode of operation is commonly referred to as "commutating forward". Preferably the circuit arrangement is equipped with a power control loop for controlling the average value of the total power consumed by both lamps at a desired value by adjusting the time lapse during which the first switching element is rendered conductive during each high frequency period in the first operating state and during which the second switching element is rendered conductive during each high frequency period in the second operating state. Such a power control loop compensates for tolerances in the components of the circuit arrangement.

Good results have also been obtained for embodiments of a circuit arrangement according to the invention, wherein the first circuit element comprises a third switching element and the second circuit element comprises a fourth switching element, the control circuit being coupled to respective control electrodes of the third switching element and the fourth switching element for controlling the conductive state of the third and the fourth switching element. Such embodiments are full bridge circuits that allow the independent operation of lamps with a high lamp voltage in parallel or alternatively the operation of two or more series arrangements of lamps (with a similar lamp voltage) in parallel. Also for these embodiments of a circuit arrangement according to the invention it has been found that they are particularly suitable for operating high pressure discharge lamps in parallel in case the control circuit is equipped with means for alternately at a low frequency operating the circuit arrangement in a first or a second operating state, wherein in the first operating state the second and the third switching elements are maintained non-conductive while the fourth switching element is maintained conductive and the first switching element is rendered conductive and non-conductive at a high frequency, and wherein in the second operating state the third switching element is maintained conductive while the second switching element is rendered conductive and non-conductive at a high frequency and the first and the fourth switching elements are maintained non-conductive. Also in these embodiments it is desirable that the circuit arrangement is equipped with a power control loop to compensate for tolerances in the components of the circuit arrangement.

BRIEF DESCRIPTION OF THE DRAWINGS

Embodiments of a circuit arrangement according to the present invention will be further explained making reference to a drawing. In the drawing.

DETAILED DESCRIPTION OF THE PREFERRED EMBODIMENTS

Figure 1:
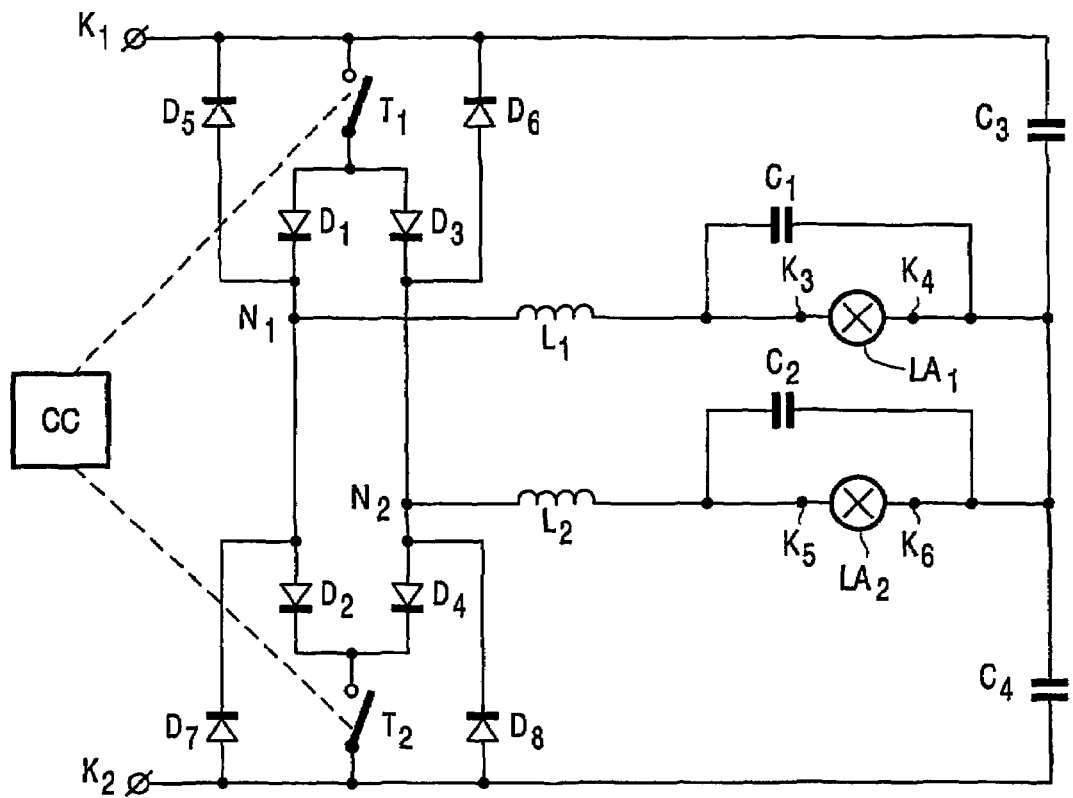
FIG. 1 shows a first embodiment of a circuit arrangement according to the invention with two lamps connected to it.

In FIG. 1, K1 and K2 are input terminals for connection to a supply voltage source. Input terminals K1 and K2 are connected by means of a series arrangement of first switching element T1, diode D1, terminal N1, diode D2 and switching element T2. Diodes D1 and D2 respectively form a first and a second diode. Diodes D1 and D2 together with terminal N1 form a series arrangement III connecting the first and the second switching element. Series arrangement III is shunted by a series arrangement of diode D3, terminal N2 and diode D4. Diodes D3 and D4 respectively form a third and a fourth diode. Diodes D3 and D4 together with terminal N2 form a series arrangement IV connecting the first and the second switching element. The first switching element T1, the second switching element T2 and the parallel arrangement of series arrangements III and IV together form a series arrangement I. The series arrangement of diode D1 and first switching element T1 is shunted by diode D5 that forms a fifth diode. The series arrangement of diode D3 and first switching element T1 is shunted by diode D6 that forms a sixth diode. The series arrangement of diode D2 and second switching element T2 is shunted by diode D7 that forms a seventh diode. The series arrangement of diode D4 and second switching element T2 is shunted by diode D8 that forms an eighth diode. Respective control electrodes of the first and the second switching elements are coupled to output terminals of a circuit part CC. In FIG. 1 this coupling is indicated by means of dotted lines. Circuit part CC is a control circuit for controlling the conductive state of the first and second switching element. Input terminals of control circuit CC are also coupled to the diodes D5–D8 to enable the control circuit CC to monitor which of the diodes D5–D8 are (is) carrying a current and which diodes are non-conducting. This coupling has not been indicated in FIG. 1, to avoid FIG. 1 becoming unclear because of a plurality of dotted lines. Input terminals K1 and K2 are also connected by means of a series arrangement of capacitors C3 and C4. Capacitors C3 and C4 respectively form a first circuit element A and a second circuit element B. Terminal N1 is connected to a common terminal of capacitors C3 and C4 by means of a series arrangement of a first ballast inductor L1, first lamp connection terminal K3, high pressure discharge lamp LA1 and first lamp connection terminal K4. The first lamp connection terminals K3 and K4 are connected by means of a filter capacitor C1. First ballast inductor L1, first lamp connection terminals K3 and K4, high pressure discharge lamp LA1 and filter capacitor C1 together form a first load circuit. Terminal N2 is connected to a common terminal of capacitors C3 and C4 by means of a series arrangement of a second ballast inductor L2, second lamp connection terminal K5, high pressure discharge lamp LA2 and second lamp connection terminal K6. The second lamp connection terminals K5 and K6 are connected by means of a filter capacitor C2. Second ballast inductor L2, second lamp connection terminals K5 and K6, high pressure discharge lamp LA2 and filter capacitor C2 together form a second load circuit.

The operation of the circuit arrangement shown in FIG. 1 is as follows. In case input terminals K1 and K2 are connected to a supply voltage source supplying a DC supply voltage, the control circuit CC alternately and at a low frequency operates the circuit arrangement in a first and a second operating state. During the first operating state the first switching element T1 is rendered conductive and non-conductive at a high frequency, while the second switching element T2 is maintained in a non-conductive state. When the first switching element T1 is conductive the current through the first ballast inductor increases linearly with the time. Similarly the current through the second ballast inductor also increases linearly with the time, However, since LA1 and LA2 are both high pressure lamps their lamp voltages may differ considerably for instance because of a difference in age (age=total number of burning hours). In case for instance lamp LA1 has a much lower lamp voltage than lamp LA2, this causes the current through the first ballast inductor L1 to increase faster than the current through the second ballast inductor L2. As a consequence, the amplitude of the current through first ballast inductor L1 has a higher amplitude than the current through the second ballast inductor L2, when the first switching element is rendered non-conductive. After the first switching element T1 has been rendered non-conductive, diode D7 conducts the current through the first ballast inductor L1 and diode D8 conducts the current through the second ballast inductor L2. The polarity of the currents through the first and the second ballast inductors L1 and L2 is maintained, but their amplitudes decrease linearly. Since the amplitude of the current through the second ballast inductor was smaller than that of the current through the first ballast inductor, at the time the first switching element T1 was rendered non-conductive, the amplitude of the current through the second ballast inductor will drop to zero first and diode D8 will become non-conductive while diode D7 still conducts. Although some dampened ringing will take place due to the presence of parasitic capacitances, the amplitude of the current through the second ballast inductor is substantially maintained equal to zero until the current through the first ballast inductor reaches zero too so that also diode D7 stops conducting. When the currents through diode D7 and diode D8 have both dropped to zero, the first switching element is rendered conductive once more. This can be done immediately after both diodes have become non-conductive (this mode of operation is called critical discontinuous mode) or a predetermined time lapse after both diodes have become non-conductive (this mode of operation is called discontinuous mode).

Since in the circuit arrangement shown in FIG. 1 the time interval needed for the current through the first ballast inductor L1 to drop to zero may be (and in practice nearly always will be) different from the time interval that is needed for the current through the second ballast inductor L2 to drop to zero, the operation of high pressure lamp LA1 is independent from the operation of high pressure lamp LA2. It has been found that this independent operation of the two lamps causes the amounts of power consumed by the lamps to differ comparatively little, even when the lamps have substantially different lamp voltages because of a different age (=different number of burning hours). The current in each of the ballast inductors has a triangular shape. By means of the filter capacitors C1 and C2, these triangularly shaped currents are transformed into continuous DC currents that flow through the lamps LA1 and LA2.

During the second operating state, the first switching element is maintained in a non-conductive state, while the second switching element is rendered conductive and non-conductive at a high frequency. When the second switching element is non-conductive, diodes D5 and D6 carry the current through respectively the first ballast inductor L1 and the second ballast inductor L2. Only after diode D5 and diode D6 have both become non-conductive, second switching element T2 is rendered conductive again, either immediately or after a predetermined time lapse. Also in this second operating state, the current in each of the ballast inductors has a triangular shape. By means of the filter capacitors C1 and C2, these triangularly shaped currents are transformed into continuous DC currents that flow through the lamps LA1 and LA2. The polarity of the currents through the lamps and the ballast inductors is reversed with respect to the first operating state.

Figure 2:
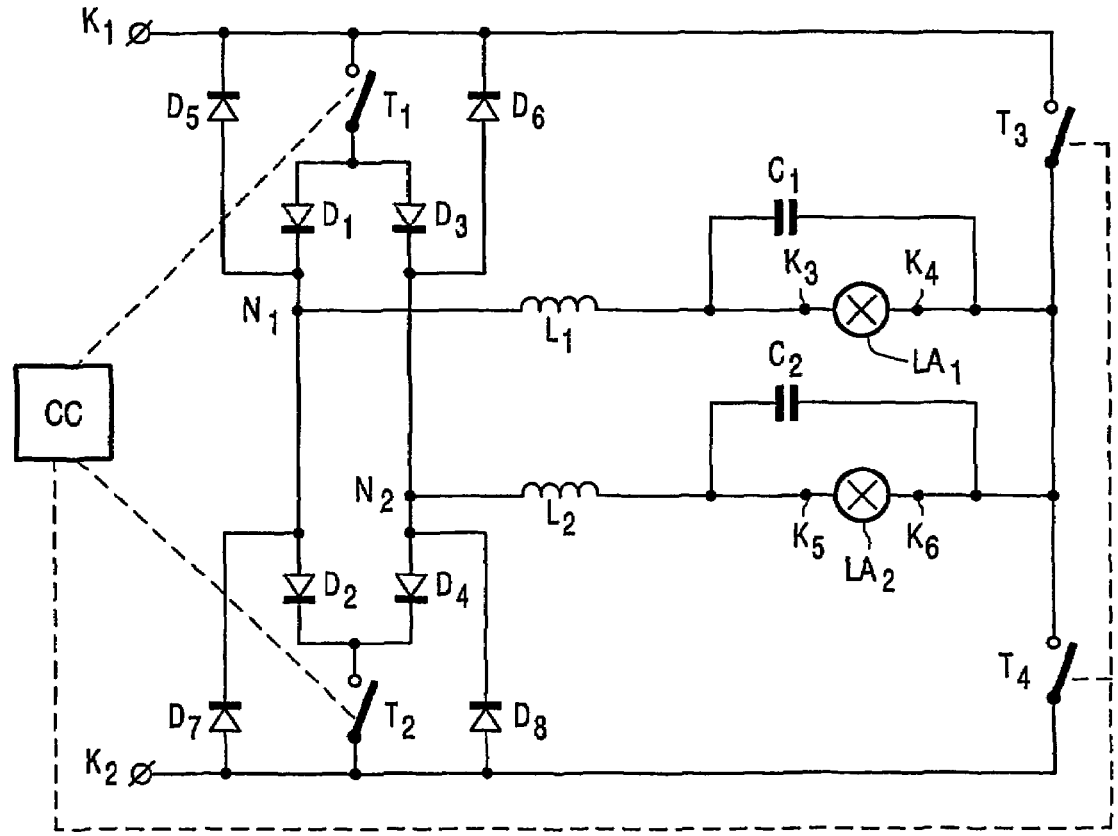
FIG. 2 shows a second embodiment of a circuit arrangement according to the invention with two lamps connected to it.

In FIG. 2, circuit parts and components that correspond to similar circuit parts and components in the embodiment shown in FIG. 1 are labeled with the same references. The configuration of the embodiment shown in FIG. 2 only differs from the embodiment shown in FIG. 1, in that the capacitors C3 and C4 have been replaced by a third switching element T3 and a fourth switching element T4 respectively. In the embodiment shown in FIG. 2, third switching element T3 and fourth switching element T4 form a first circuit element A and a second circuit element A respectively. Third switching element T3 and fourth switching element T4 together form a series arrangement II connecting the input terminals. Respective control electrodes of the third switching element T3 and the fourth switching element T4 are coupled to output terminals of the control circuit CC. In FIG. 2 this coupling is indicated by means of dotted lines. Respective input terminals of control circuit CC are coupled to diodes D5–D8 to monitor which diodes are conducting a current and which diodes are non-conducting. Also in FIG. 2 these couplings are not indicated.

The operation of the circuit arrangement shown in FIG. 2 is as follows. In case input terminals K1 and K2 are connected to a supply voltage source supplying a DC supply voltage, the control circuit CC alternately and at a low frequency operates the circuit arrangement in a first and a second operating state.

In the first operating state switching elements T2 and T3 are maintained non-conductive while switching element T4 is maintained conductive and switching element T1 is rendered conductive and non-conductive at a high frequency. In the second operating state switching element T3 is maintained conductive while switching element T2 is rendered conductive and non-conductive at a high frequency and switching elements T1 and T4 are maintained non-conductive. Since the circuit arrangement shown in FIG. 2 is a full bridge circuit, the voltage that is present during operation over the load circuits is twice as high as the voltage present over the load circuits in the half bridge circuit shown in FIG. 1. Otherwise, the operation of the embodiment shown in FIG. 2 is completely analogous to the operation of the circuit arrangement shown in FIG. 1. During each of the two operating states the circuit arrangement is operated in either the critical discontinuous mode or the discontinuous mode, resulting in triangularly shaped currents flowing through the ballast inductors that are transformed into continuous DC lamp currents by means of the filter capacitors C1 and C2. Also in this embodiment independent lamp operation is assured in the first operating state by rendering switching element T1 only conductive after both diodes D7 and D8 have become non-conductive and in the second operating state by rendering switching element T2 only conductive after both diodes D5 and D6 have become non-conductive.

It be remarked that in practice it is desirable, for the embodiment shown in FIG. 1 as well as for the embodiment in FIG. 2 to install a power control loop for controlling the average value of the total power consumed by both lamps at a desired value by adjusting the time lapse during which the first switching element is rendered conductive during each high frequency period in the first operating state and during which the second switching element is rendered conductive during each high frequency period in the second operating state. Such a power control loop as such is very well known in the art. The power control loop assures that the total amount of power consumed by different practical embodiments of the same circuit arrangement will approximately be the same although the electrical properties of similar components used in the different practical embodiments may differ.

The invention claimed is:

1. Circuit arrangement for operating a lamp load comprising
    input terminals for connection to a supply voltage source,
    a series arrangement I comprising a first switching element and a second switching element and connecting the input terminals,
    a control circuit coupled to respective control electrodes of the first switching element and the second switching element for controlling the conductive state of the first and the second switching element,
    a series arrangement II comprising a first circuit element A and a second circuit element B and connecting the input terminals,
    a first load circuit comprising a first ballast inductor and first lamp connection terminals and connecting a terminal N1 of the series arrangement I between the switching elements to a terminal of the series arrangement II between the first circuit element A and the second circuit element B,
characterized in that the circuit arrangement comprises
    a series arrangement III comprising terminal N1, a first diode D1 and a second diode D2 and connecting the first switching element and the second switching element, terminal N1 being situated between first diode D1 and second diode D2,
    a series arrangement IV comprising a third diode D3 and a fourth diode D4 and connecting the first switching element and the second switching element,
    a fifth diode D5 shunting the first switching element and diode D1,
    a sixth diode D6 shunting the first switching element and diode D3,
    a seventh diode D7 shunting the second switching element and diode D2,
    an eighth diode D8 shunting the second switching element and diode D4,
    a second load circuit comprising a second ballast inductor and second lamp connection terminals and connecting a terminal N2 of the series arrangement IV, situated between the third diode D3 and the fourth diode D4 to a terminal of the series arrangement II between the first circuit element A and the second circuit element B.

2. Circuit arrangement according to claim 1, wherein the first circuit element A and the second circuit element B each comprise a capacitor.

3. Circuit arrangement according to claim 1, wherein the first circuit element comprises a third switching element and the second circuit element comprises a fourth switching element, the control circuit being coupled to respective control electrodes of the third switching element and the fourth switching element for controlling the conductive state of the third and the fourth switching element.

4. Circuit arrangement as claimed in claim 2, wherein the control circuit is equipped with means for alternately at a low frequency operating the circuit arrangement in a first and a second operating state, wherein in the first operating state the first switching element is rendered conductive and non-conductive at a high frequency while the second switching element is maintained in a non-conductive state, and wherein in the second operating state the second switching element is rendered conductive and non-conductive at a high frequency while the first switching element is maintained in a non-conductive state.

5. Circuit arrangement as claimed in claim 3, wherein the control circuit is equipped with means for alternately at a low frequency operating the circuit arrangement in a first or a second operating state, wherein in the first operating state the second and the third switching elements are maintained non-conductive while the fourth switching element is maintained conductive and the first switching element is rendered conductive and non-conductive at a high frequency, and wherein in the second operating state the third switching element is maintained conductive while the second switching element is rendered conductive and non-conductive at a high frequency and the first and the fourth switching elements are maintained non-conductive.

6. Circuit arrangement as claimed in claim 4, wherein the circuit arrangement is equipped with a power control loop for controlling the average value of the total power consumed by both lamps at a desired value by adjusting the time lapse during which the first switching element is rendered conductive during each high frequency period in the first operating state and during which the second switching element is rendered conductive during each high frequency period in the second operating state.

* * * * *